US012390673B1

(12) United States Patent
Power, II et al.

(10) Patent No.: US 12,390,673 B1
(45) Date of Patent: Aug. 19, 2025

(54) HARNESS ROPE ASSEMBLY

(71) Applicant: Tethrd LLC, Columbia, TN (US)

(72) Inventors: Walter Ernest Power, II, Columbia, TN (US); Gregory Alan Godfrey, Richmond Hill, GA (US); Carl Eugene Kossuth, III, Rolla, MO (US); Shawn Paul Chadwick, Merrill, WI (US)

( * ) Notice: Subject to any disclaimer, the term of this patent is extended or adjusted under 35 U.S.C. 154(b) by 0 days.

(21) Appl. No.: 19/060,283

(22) Filed: Feb. 21, 2025

Related U.S. Application Data

(63) Continuation of application No. 19/028,142, filed on Jan. 17, 2025, now abandoned.

(51) Int. Cl.
*A62B 35/00* (2006.01)

(52) U.S. Cl.
CPC ...... *A62B 35/0012* (2013.01); *A62B 35/0025* (2013.01)

(58) Field of Classification Search
CPC ............ A62B 35/0012; A62B 35/0025; A62B 35/0075; A62B 35/0037; A01M 31/02
See application file for complete search history.

(56) References Cited

U.S. PATENT DOCUMENTS 1,775,736 A * 9/1930 Rose ........................ A01G 3/08 182/6
4,396,091 A * 8/1983 Anderson ............. A01M 31/02 224/184
5,970,697 A * 10/1999 Jacobs ................... D07B 1/185 57/22
6,712,181 B2 * 3/2004 Nichols .................... A62B 1/16 182/5
8,038,584 B1 * 10/2011 Pruessner .............. A61H 11/00 482/91
9,162,091 B2 * 10/2015 Kuhnert ............. A62B 35/0068
11,077,004 B2 * 8/2021 Arnold ................. A61G 7/1013
11,351,405 B2 * 6/2022 Power, II .............. A01M 31/02
11,504,556 B2 * 11/2022 Power, II .............. A01M 31/02
11,771,931 B2 * 10/2023 Leach ................ A62B 35/0025 182/3
11,965,288 B2 * 4/2024 De Jager ................ D07B 5/005
2003/0062218 A1 * 4/2003 Zeissler ................. A62B 35/00 182/3
2007/0102240 A1 * 5/2007 Wilson ............... A62B 35/0075 182/5
2008/0000719 A1 * 1/2008 Jones ................. A62B 35/0075 182/3
2019/0210696 A1 * 7/2019 Barnes ...................... D07B 1/16
2020/0398087 A1 * 12/2020 Power, II ........... A62B 35/0012

(Continued)

*Primary Examiner* — Brian D Mattei
*Assistant Examiner* — Kathleen M. McFarland

(57) ABSTRACT

A harness rope assembly includes a first rope consisting of a loop, a second rope, a bridge rope, and a third rope. The second rope includes a closed loop, a first free tether, and a second free tether. Each of the first and second free tethers has a free end and an attached end. The attached ends are attached to one another and the closed loop to together form a central splice. The free ends are inserted through the loop and spliced into an interior of the second rope on either side of the central splice to form a first closed attachment loop and a second closed attachment loop both interlocked with the loop. The bridge rope includes an end loop. The third rope is spliced together in a similar manner as the second rope and interlocked with the end loop.

16 Claims, 16 Drawing Sheets

(56) References Cited

U.S. PATENT DOCUMENTS

| | | | | |
|---|---|---|---|---|
| 2021/0228923 | A1* | 7/2021 | Power, II | A62B 35/0037 |
| 2022/0178074 | A1* | 6/2022 | Pavel | B66C 1/122 |
| 2022/0241624 | A1* | 8/2022 | Jarusiewic | A62B 35/0006 |
| 2023/0173312 | A1* | 6/2023 | Gregoire, Jr. | A62B 35/0012<br>182/9 |

* cited by examiner

HARNESS ROPE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to harness rope structures for hunting and other outdoor activities and more particularly pertains to a new harness rope structure for suspending a user in a harness to an object or structure. For example, in saddle hunting, a hunter sits or reclines in a saddle harness assembly that is secured at either end to a bridge rope, which is in turn connected to a tree. The new harness rope assembly includes a bridge rope and an adjustable connection between the bridge rope and the ends of the saddle to provide the hunter with the ability to adjust the tension of the saddle at different portions of the body of the hunter for comfort and stability.

(2) Description of Related Art Including Information Disclosed Under 37 CFR 1.97 and 1.98

The prior art relates to rope harnesses hunting and other outdoor activities. The prior art, as best understood, does not disclose a harness securing system that includes a first rope interlocked with a second rope, and a bridge rope interlocked with a third rope, wherein the second rope and the third rope have spliced sections to form several closed loops for a secure interlock that also allows adjustment of the tension of the harness at different portions of the body of the user.

BRIEF SUMMARY OF THE INVENTION

An embodiment of the disclosure meets the needs presented above in a harness securing system generally comprising a first rope consisting of a loop, a second rope, a bridge rope, and a third rope. The second rope includes a closed loop, a first free tether, and a second free tether. Each of the first free tether and the second free tether has a free end and an attached end. Each of the attached ends is attached to each other and to the closed loop to form a central splice. Each of the free ends is inserted through the loop of the first rope and into an interior of the second rope on either side of the central splice that acts as a securing member in the harness rope assembly. Each of the free ends is spliced to the closed loop to form a first closed attachment loop and a second closed attachment loop both interlocked with the loop of the first rope. The bridge rope has a first end and a second end. The first end includes an end loop. The third rope includes a closed circlet, a first free line, and a second free line. Each of the first free line and the second free line has a loose end and a secured end. Each of the secured ends is attached to each other and to the closed circlet to form a main splice that acts as a securing member in the harness rope assembly. Each of the loose ends is inserted through the end loop of the bridge rope and into an interior of the third rope on either side of the main splice. Each of the loose ends is spliced to the closed circlet to form a first closed attachment circlet and a second closed attachment circlet both interlocked with the end loop of the bridge rope.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
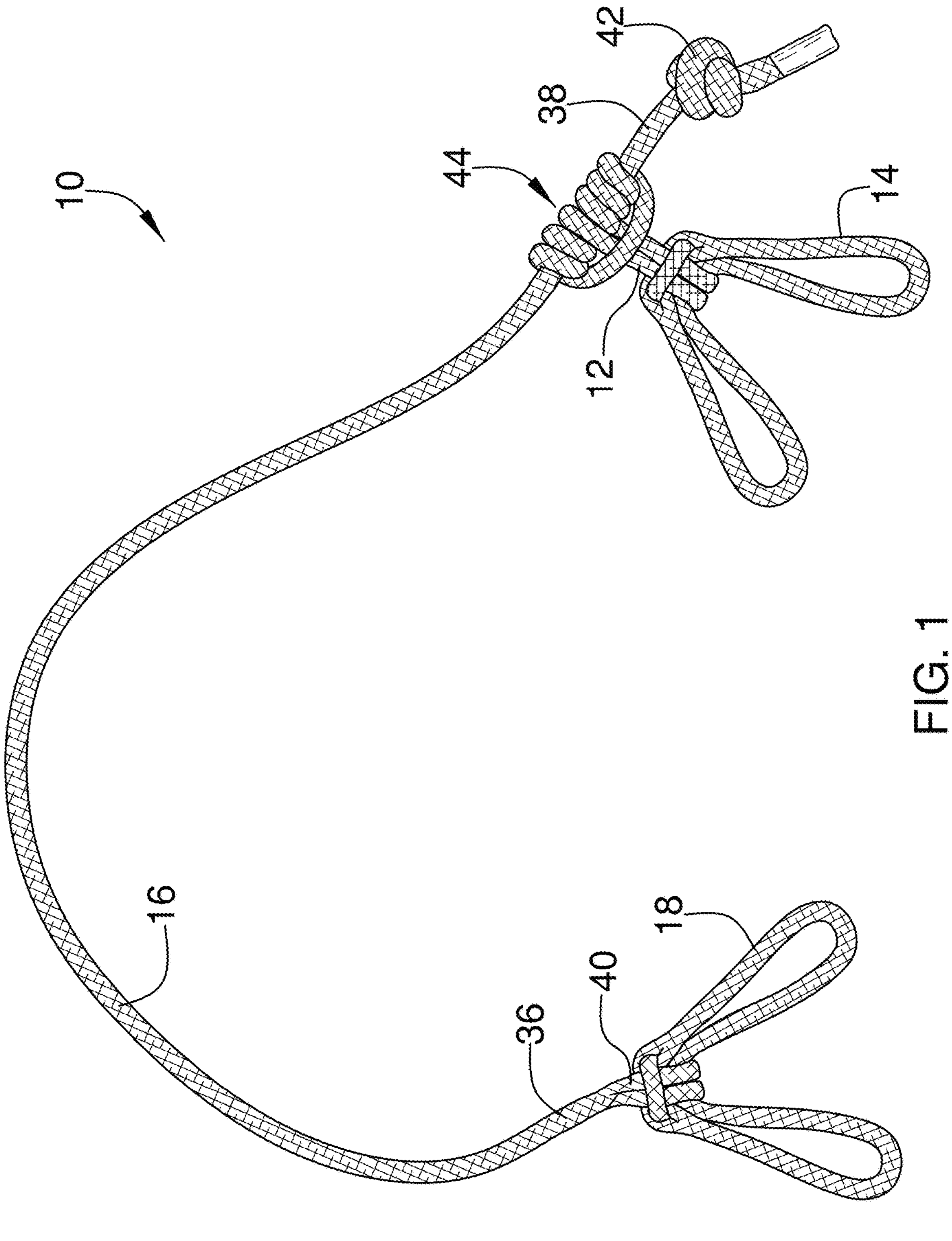
FIG. 1 is a perspective view of a harness rope assembly according to an embodiment of the disclosure.

With reference now to the drawings, and in particular to FIGS. 1 through 16 thereof, a new harness rope assembly embodying the principles and concepts of an embodiment of the disclosure and generally designated by the reference numeral 10 will be described.

Figure 2:
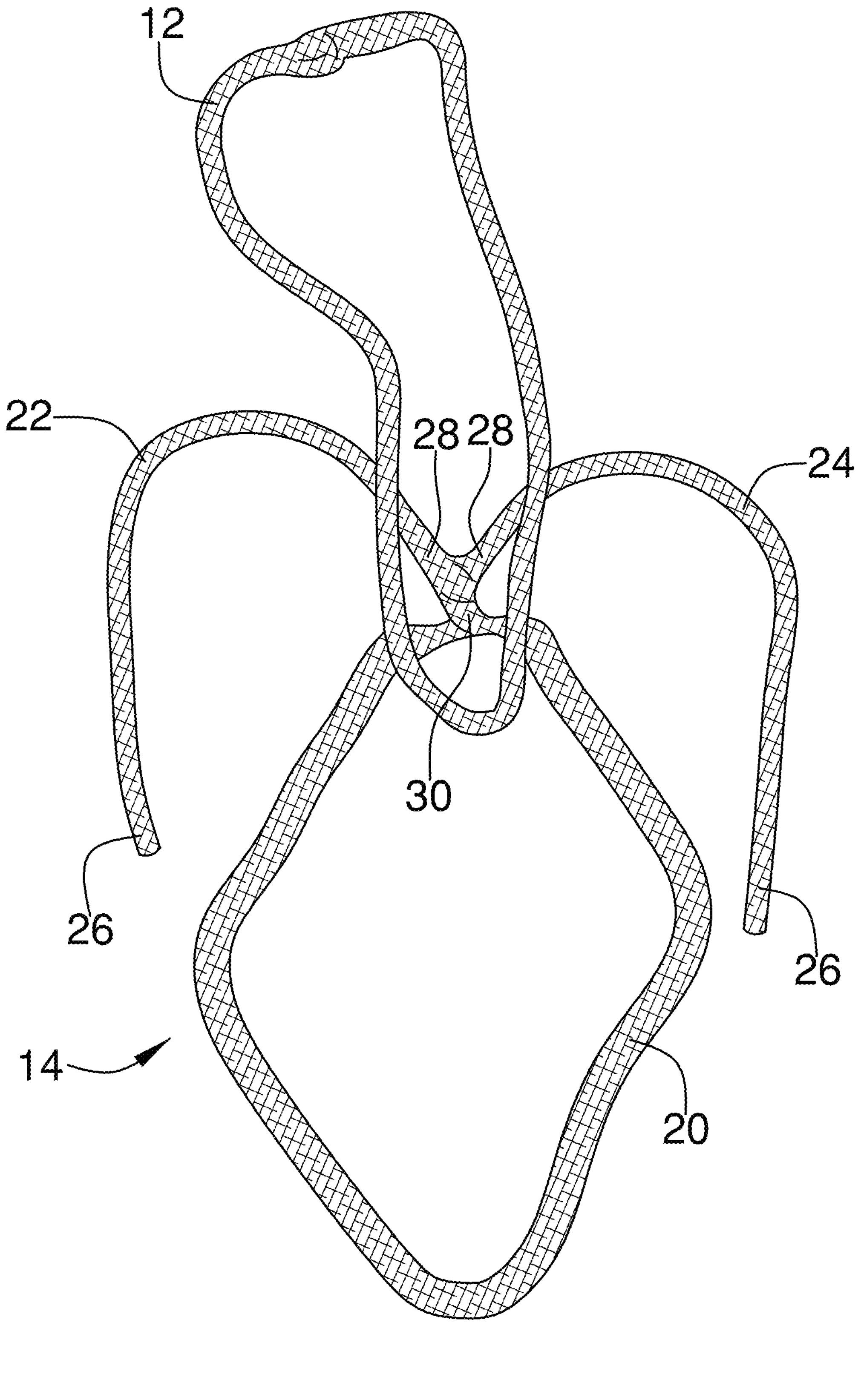
FIG. 2 is a front view of components of an embodiment of the disclosure.
Figure 3:
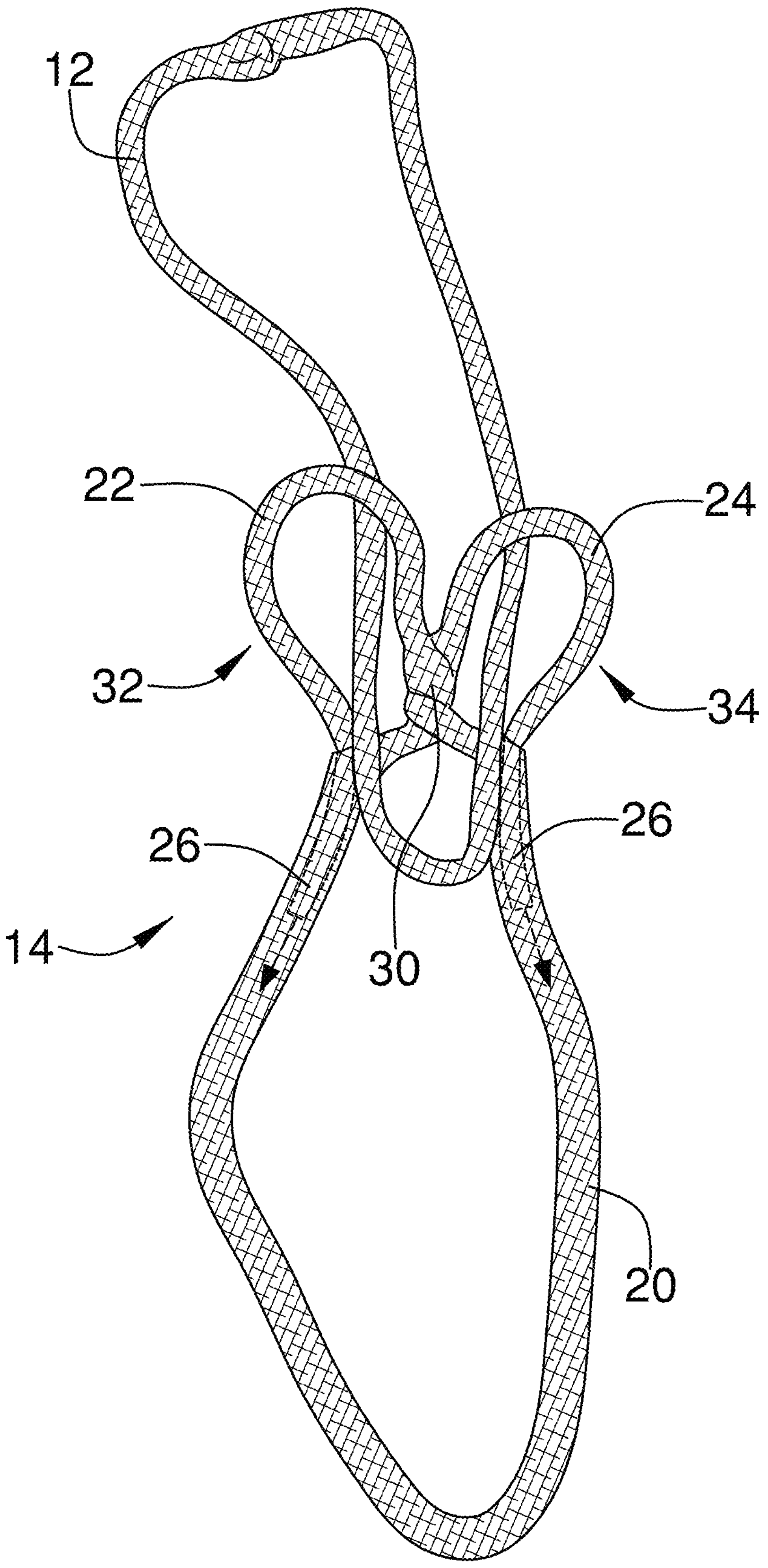
FIG. 3 is a front view of the components of an embodiment of the disclosure in FIG. 2.
Figure 4:
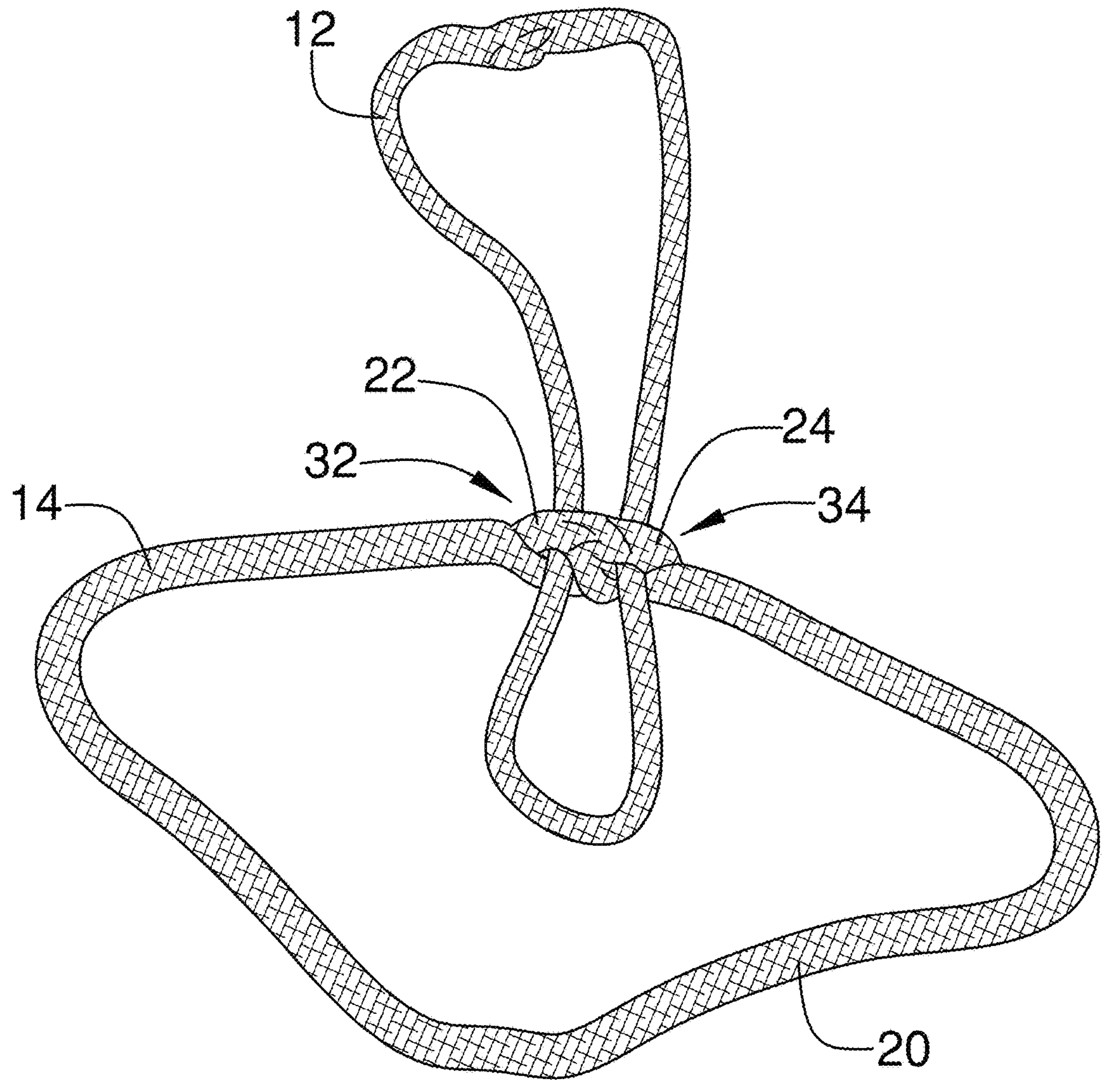
FIG. 4 is a front view of the components of an embodiment of the disclosure in FIG. 2.
Figure 5:
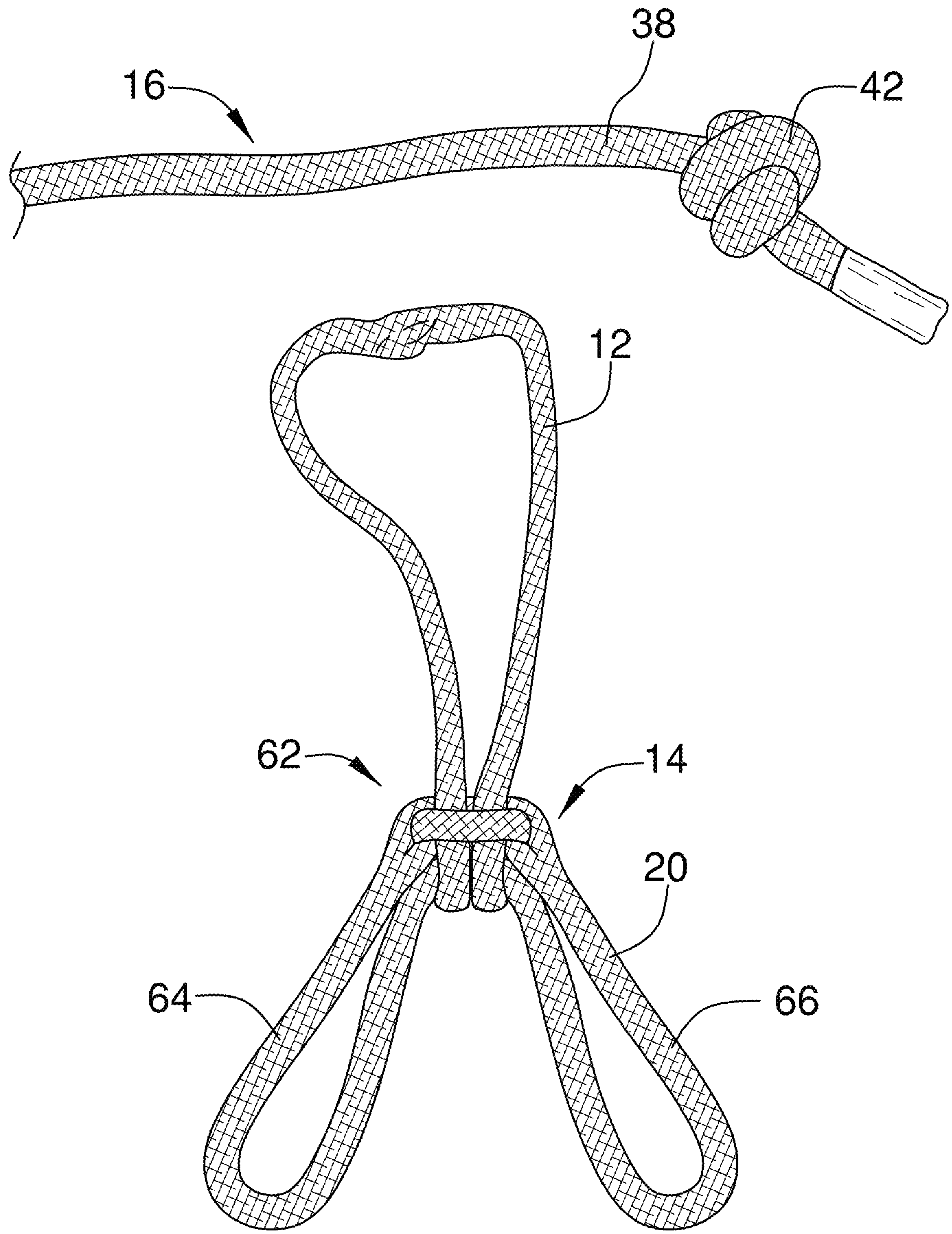
FIG. 5 is a front view of components of an embodiment of the disclosure.
Figure 6:
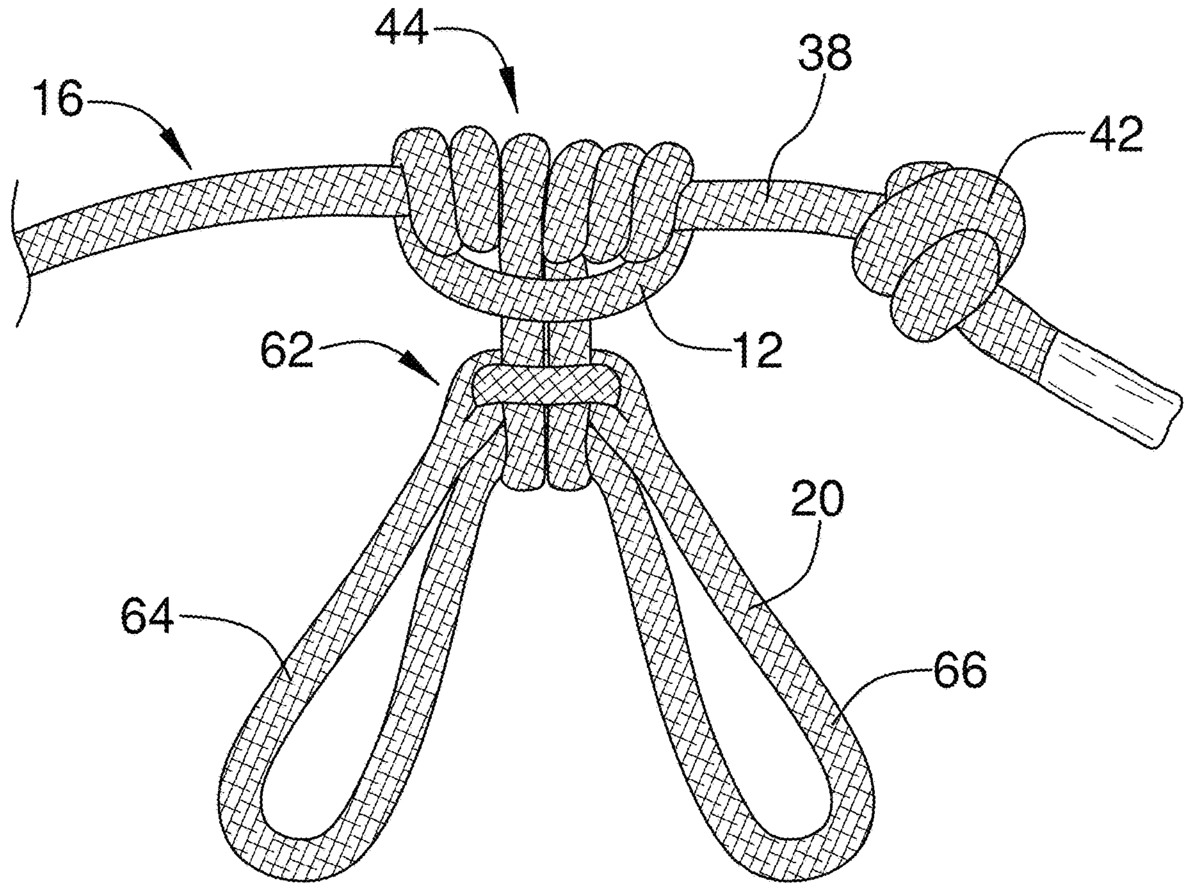
FIG. 6 is a front view of the components of an embodiment of the disclosure in FIG. 5.

As best illustrated in FIGS. 1 through 16, the harness rope assembly 10 generally comprises a first rope 12, a second rope 14, a bridge rope 16, and a third rope 18. Before discussing the harness rope assembly 10 in any further detail, it should be noted that FIGS. 2 through 4 show an exemplary embodiment of the first rope 12 and the second rope 14 and how they connect together, and FIGS. 5 and 6 show an example of how the first rope 12 could be connected to the bridge rope 16. FIGS. 7 through 10 show an exemplary embodiment of the bridge rope 16 and the third rope 18 and how they connect together, which connection is similar to the connection of the first rope 12 and the second rope 14.

As shown in FIG. 2, the first rope 12 consists of a loop. The first rope 12 includes a splice to form a continuous loop of rope, though different methods to form this loop could be used, such as a knot or a clamp. The second rope 14 includes a closed loop 20, a first free tether 22, and a second free tether 24. Each of the first free tether 22 and the second free tether 24 has a free end 26 and an attached end 28. Each of the attached ends 28 is attached to each other and to the closed loop 20 to form a central splice 30. It should be noted that FIG. 2 shows the first rope 12 separate from and not yet interlocked with the second rope 14. As shown in FIG. 3, each of the free ends 26 is inserted through the loop of the first rope 12 and into an interior of the second rope 14 on either side of the central splice 30. The central splice 30 acts as a securing member of the first rope 12 to the second rope 14, though different methods of securing could be used, such as a clamp or other rigid member. In the exemplary embodiment, each of the free ends 26 is spliced to the closed loop 20 to form a first closed attachment loop 32 and a second closed attachment loop 34 both interlocked with the loop of the first rope 12. As shown in FIG. 4, the first closed attachment loop 32 and the second closed attachment loop 34 can be tightened onto the first rope 12 for a very secure and fixed connection.

As shown in FIG. 1, the bridge rope 16 has a first end 36 and a second end 38. The first end 36 includes an end loop 40. The second end 38 of the bridge rope 16 includes a stop knot 42, though a different stop could be used, such as clip or ball. The first rope 12 is positionable on the bridge rope 16 between the first end 36 and the second end 38 of the bridge rope 16. As shown in FIG. 6, the first rope 12 is designed to be coupled to the bridge rope 16 in the form of a friction hitch 44 or Prusik knot, which is selectively positionable along the bridge rope 16 between the first end 36 and the second end 38 of the bridge rope 16. However, this is only one exemplary embodiment, as the first rope 12 could be connected in other ways, such as by use of a connector like a carabiner or similar.

Figure 7:
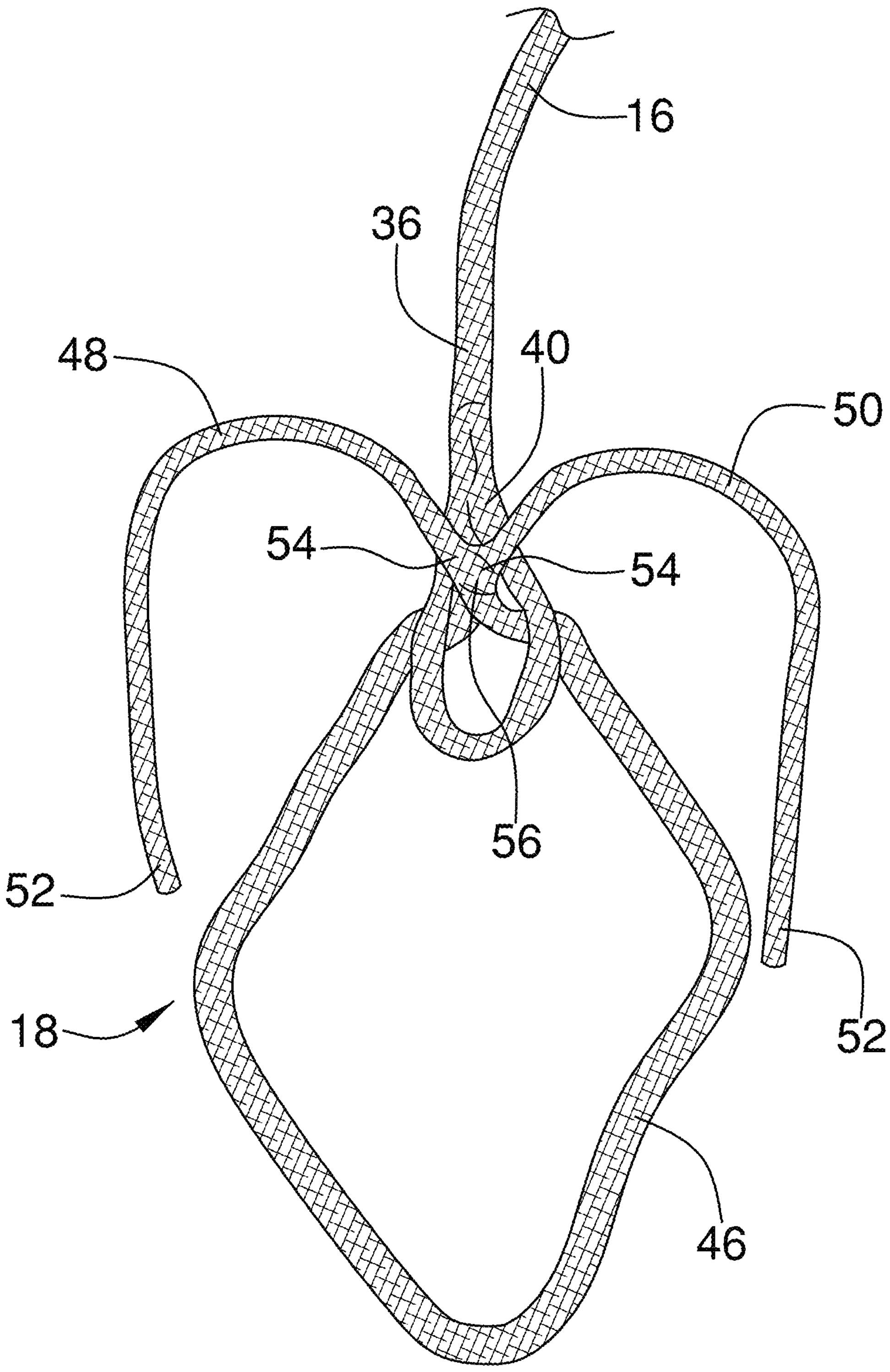
FIG. 7 is a front view of components of an embodiment of the disclosure.
Figure 8:
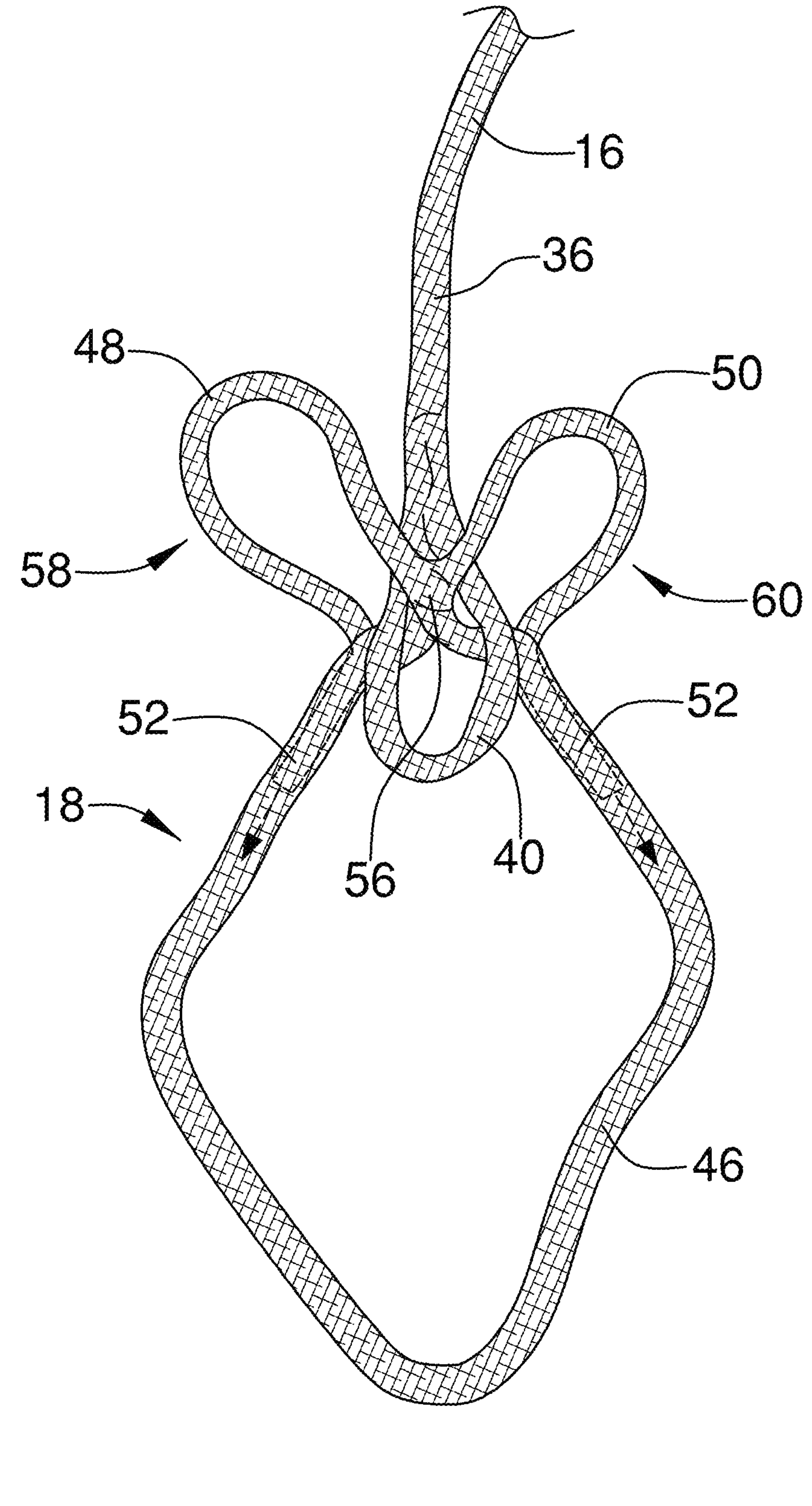
FIG. 8 is a front view of components of an embodiment of the disclosure in FIG. 7.
Figure 9:
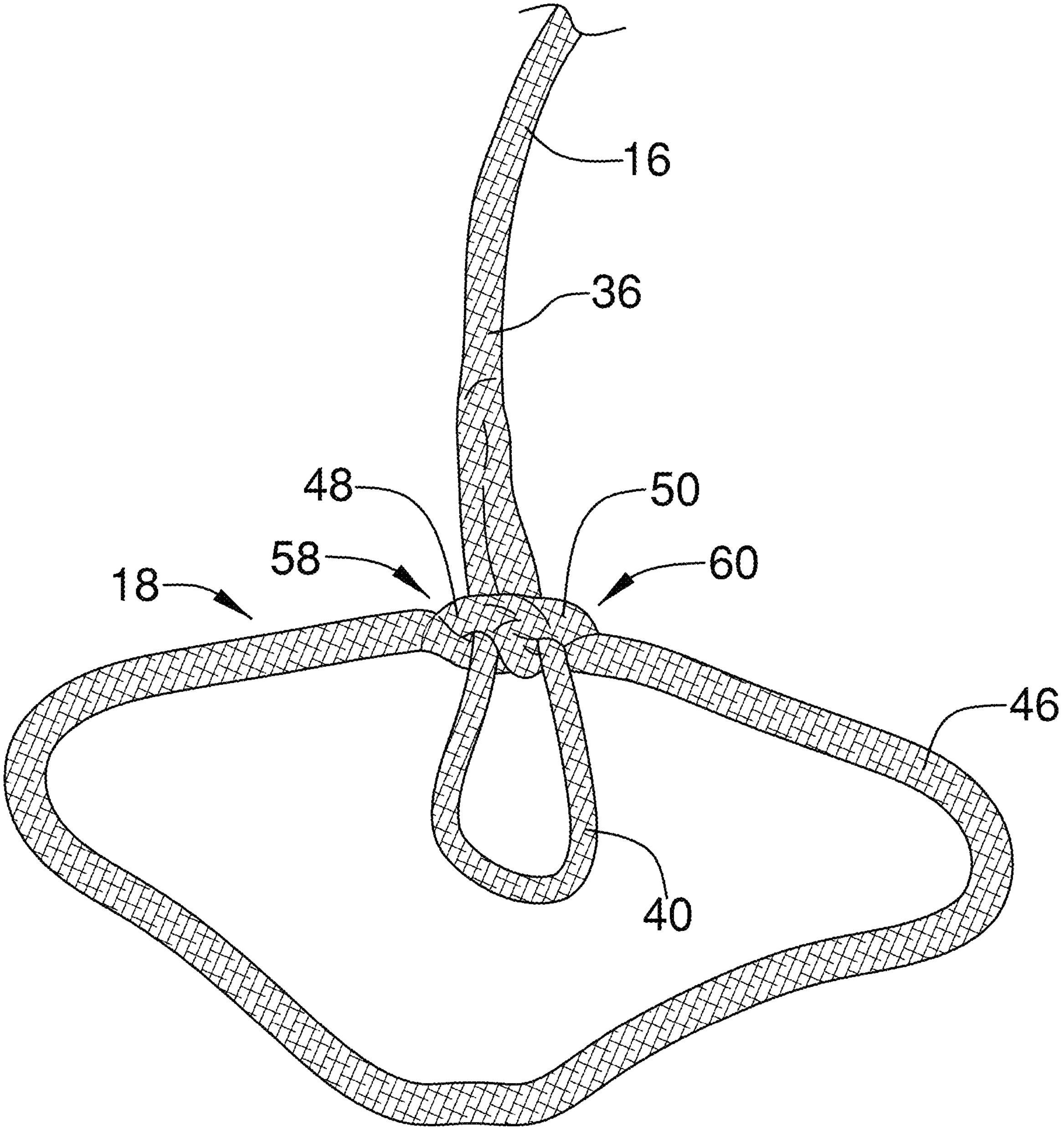
FIG. 9 is a front view of components of an embodiment of the disclosure in FIG. 7.

Only the end loop 40 of the bridge rope 16 is shown in FIGS. 7 through 10. As shown in FIG. 7, the third rope 18 includes a closed circlet 46, a first free line 48, and a second free line 50. Each of the first free line 48 and the second free line 50 has a loose end 52 and a secured end 54. Each of the secured ends 54 is attached to each other and to the closed circlet 46 to form a main splice 56. As shown in FIG. 8, each of the loose ends 52 is inserted through the end loop 40 of the bridge rope 16 and into an interior of the third rope 18 on either side of the main splice 56. The central splice 56 acts as a securing member of the third rope 18 to the end loop 40 of the bridge rope 16, though different methods of securing could be used, such as a clamp or other rigid member. In the exemplary embodiment, each of the loose ends 52 is spliced to the closed circlet 46 to form a first closed attachment circlet 58 and a second closed attachment circlet 60 both interlocked with the end loop 40 of the bridge rope 16. As shown in FIG. 9, the first closed attachment circlet 58 and the second closed attachment circlet 60 can be tightened onto the end loop 40 for a very secure and fixed connection.

Figure 10:
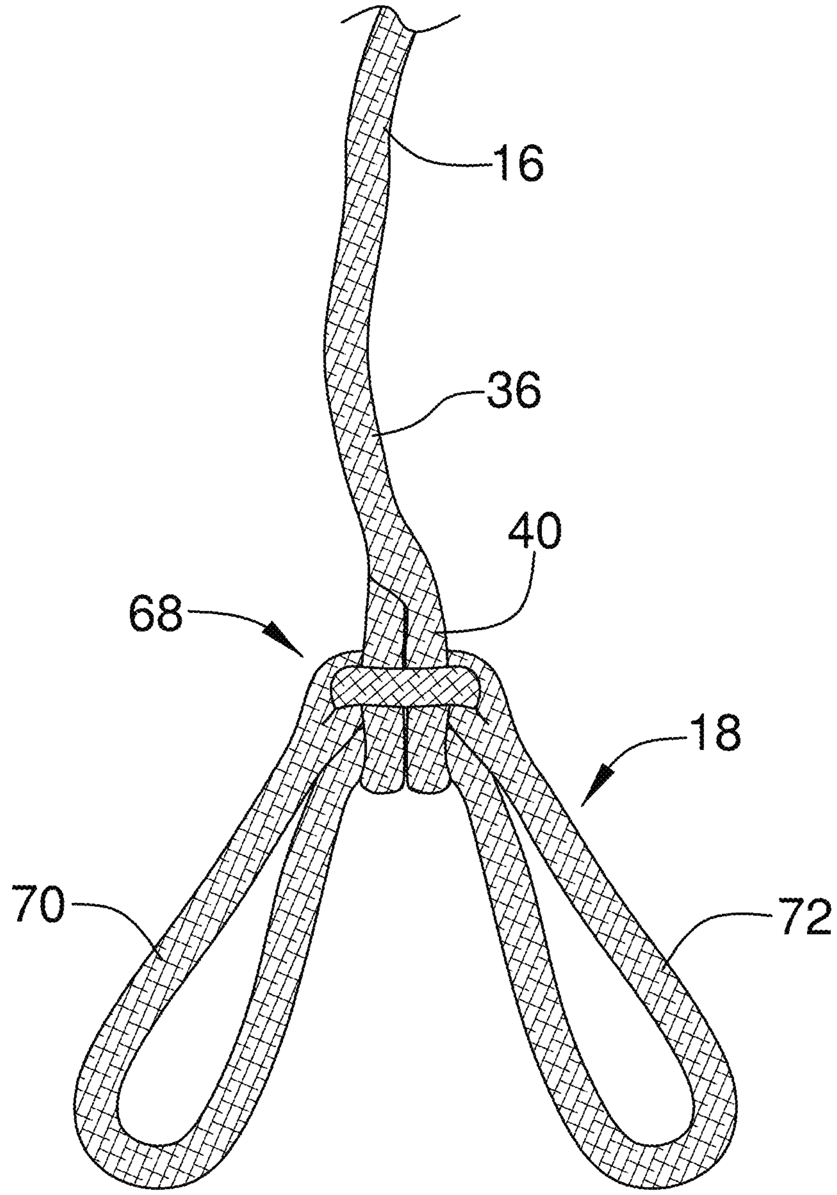
FIG. 10 is a front view of components of an embodiment of the disclosure in FIG. 7.

As shown in FIG. 5, the loop of the first rope 12 is designed to be wrapped around the closed loop 20 of the second rope 14 to form a first slip knot 62 dividing the closed loop 20 into a first connecting loop 64 and a second connecting loop 66. The closed loop 20 of the second rope 14 is selectively slidable in the first slip knot 62 to selectively adjust relative sizes of the first connecting loop 64 and the second connecting loop 66, as will be discussed further below. As shown in FIG. 10, the end loop 40 of the bridge rope 16 is designed to be wrapped around the closed circlet 46 of the third rope 18 to form a second slip knot 68 dividing the closed circlet 46 into a third connecting loop 70 and a fourth connecting loop 72. For example, a user could wrap the end loop 40, that is, the first end 36 of the bridge rope 16, around the third rope 18 and insert the second end 38 of the bridge rope 16 through the end loop 40 and pull the second end 38 tight to create the second slip knot 68 in the manner of a girth hitch. The closed circlet 46 of the third rope 18 is selectively slidable in the second slip knot 68 to selectively adjust relative sizes of the third connecting loop 70 and the fourth connecting loop 72.

Each of the first rope 12, the second rope 14, the third rope 18, and the bridge rope 16 can be made of the same or different materials suitable for securing a person in an elevated position. For example, the material could be a polyethylene, such as ultra-high molecular weight polyethylene, typically known as UHMWPE. This material characteristically includes extremely long chains of polyethylene having 100,000 to 250,000 monomer units per molecule. Such material is available from numerous suppliers. One such material is sold under the trademark Amsteel®. Amsteel® is a trademark of Samson Rope Technologies, Inc. located at 2090 Thorton Street, Ferndale, WA. This material may be blended with other materials; however, the rope may consist solely of UHMWPE. UHMWPE, while extremely strong, has a very low coefficient of friction. In addition, the splicing can be a straight splice or a Brummel splice or other suitable splice, as are well known in the stitching and harness arts, to create a very secure and strong connection.

Figure 11:
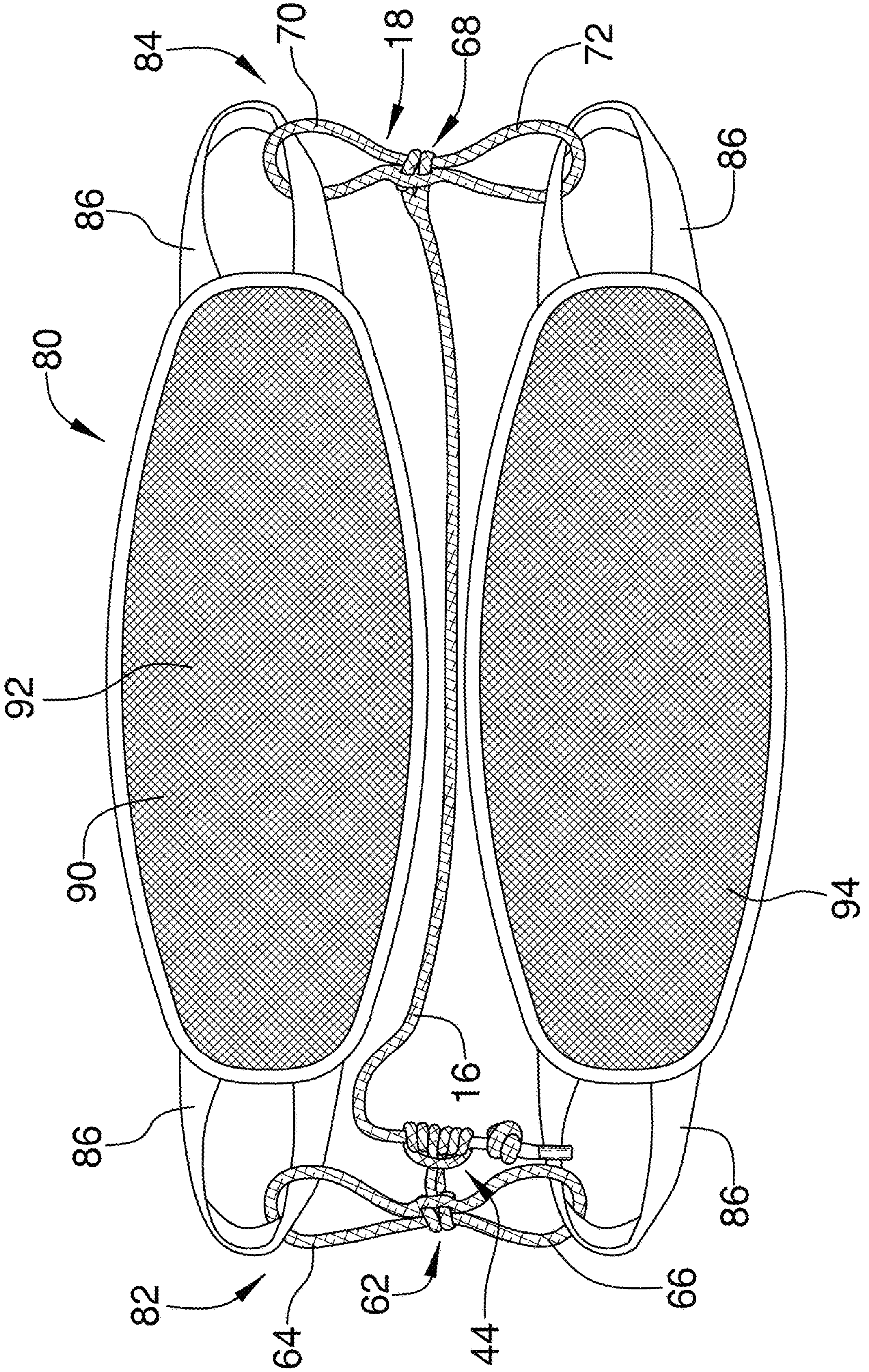
FIG. 11 is a rear view of an embodiment of the disclosure in use with a two-panel hunting saddle.

As shown in FIG. 11, each of the first connecting loop 64 and the second connecting loop 66 is designed to be coupled to a respective one of a first pair of bridge loops 86 at a first end 82 of a harness 80. Each of the third connecting loop 70 and the fourth connecting loop 72 is designed to be coupled to a respective one of a second pair of bridge loops 86 at a second end 84 of the harness 80. In the exemplary embodiment in FIGS. 11 through 14, the harness 80 is a two-panel saddle harness assembly 90 such as is used in saddle hunting where first panel 92 is the upper panel and second panel 94 is the lower panel. However, it should be understood that first panel 92 could be a lower panel and second panel 94 could be the upper panel. In the exemplary embodiment in FIGS. 15 and 16, the harness 80 is a one-panel saddle harness assembly 100, such as is also used in saddle hunting. However, it should be understood that the harness rope assembly 10 could be used with different types of harnesses, such as for climbing, utility work, rescue services, and other activities that utilize such harnesses.

Figure 12:
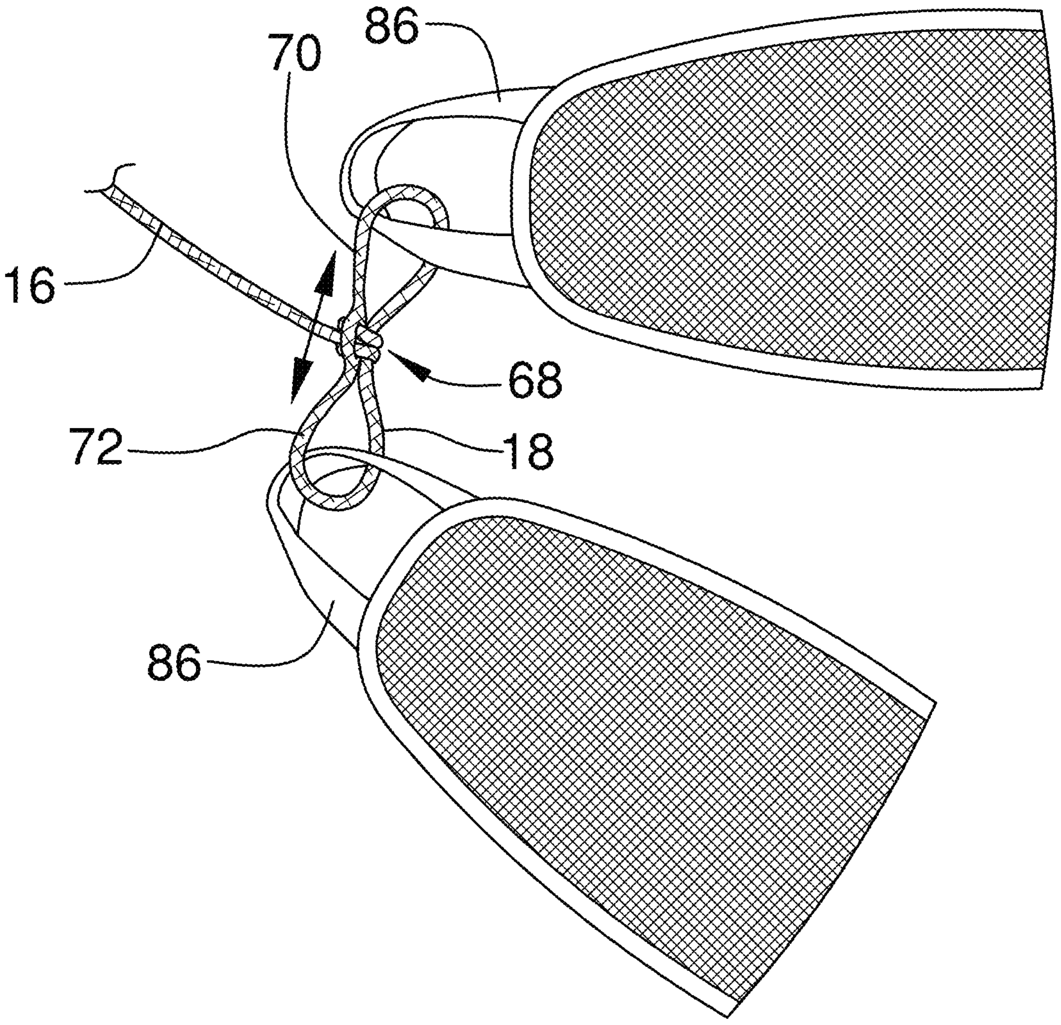
FIG. 12 is a close-up view of a portion of an embodiment of the disclosure in use with the two-panel hunting saddle harness assembly.
Figure 13:
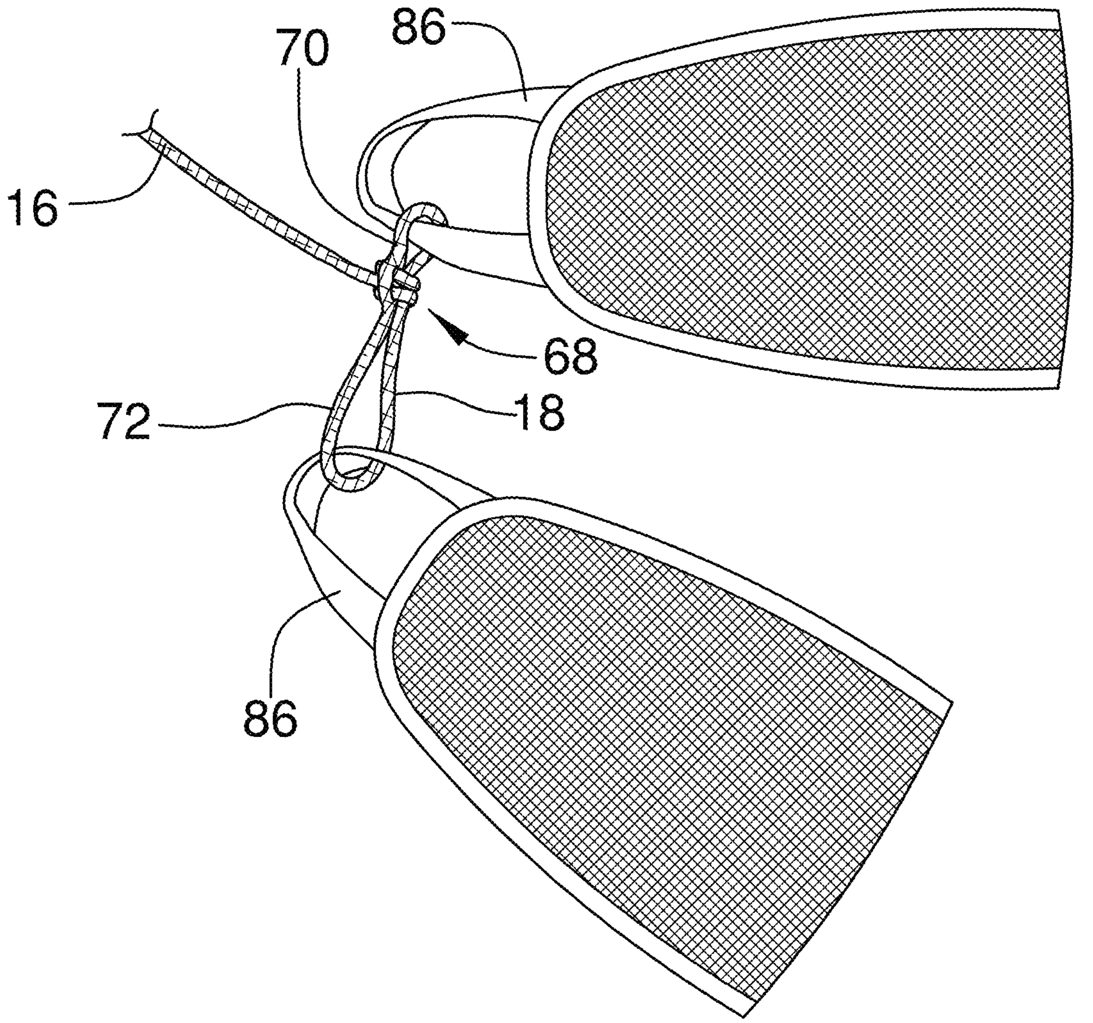
FIG. 13 is a close-up view of a portion of an embodiment of the disclosure in use with the two-panel hunting saddle harness assembly.
Figure 14:
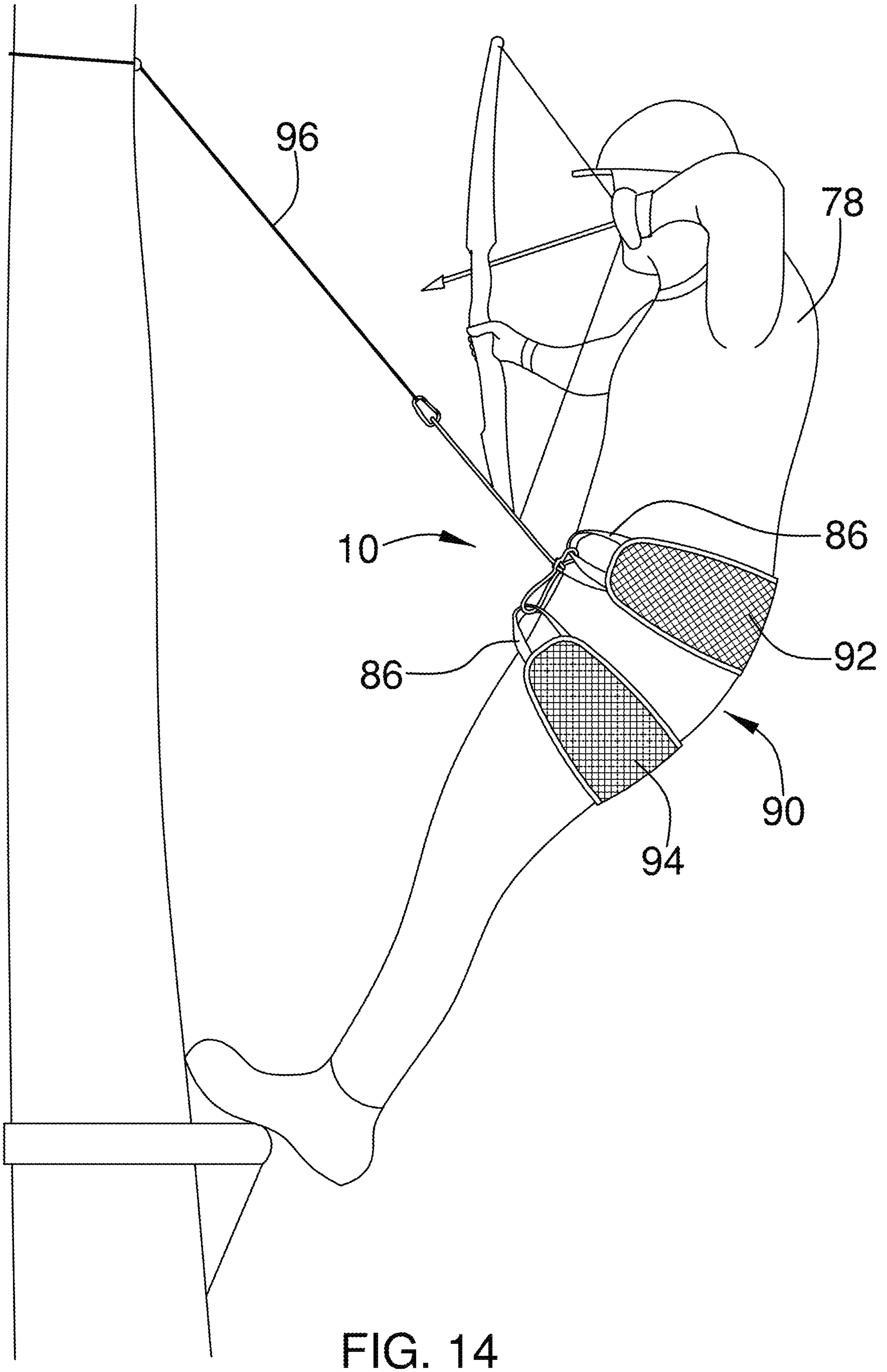
FIG. 14 is a side view of an embodiment of the disclosure in use with a two-panel hunting saddle harness assembly.
Figure 15:
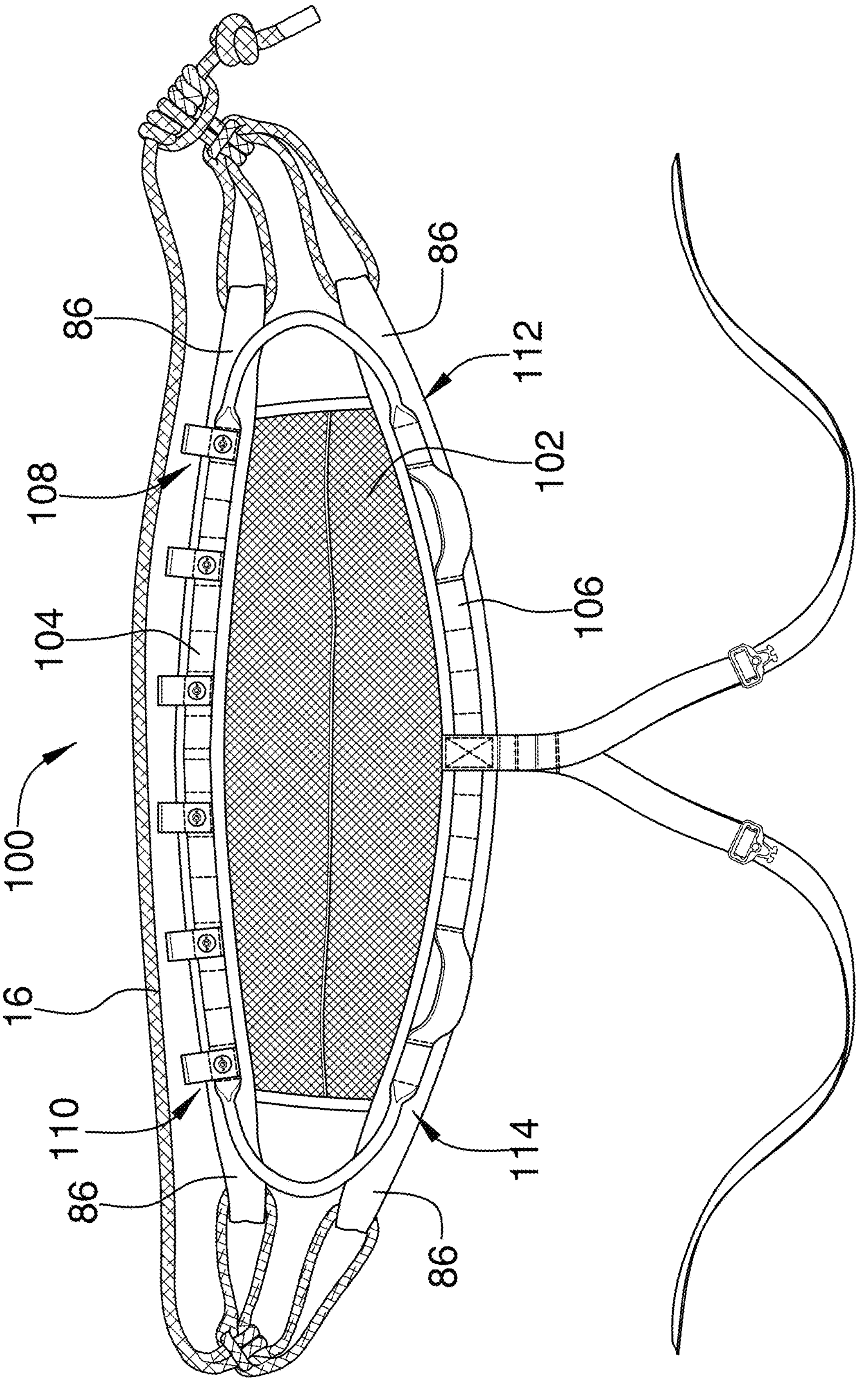
FIG. 15 is a rear view of an embodiment of the disclosure in use with a one-panel hunting saddle harness assembly.

As shown in FIG. 14, the two-panel saddle harness assembly 90 includes an first panel 92 for supporting the lower back and buttocks of the hunter 78 and a second panel 94 for supporting the buttocks and upper legs of the hunter 78. The bridge rope 16 is connected to a tree rope 96 by a carabiner or similar connector. In a traditional fixed connector design, fixed tension is exerted by both the first panel 92 and the second panel 94. However, it is desirable to be able to adjust the relative tension for both comfort and functionality. For example, one hunter 78 may wish to have greater tension at his lower back as he leans, whereas another may prefer to have greater tension under the buttocks to better support a seated orientation. The harness rope assembly 10 addresses this issue in the manner shown in FIGS. 12 and 13. Specifically, FIG. 12 shows the third rope 18 interlocked with the end loop 40, and the end loop 40 is wrapped around the third rope 18 to form the second slip knot 68 to divide the third rope 18 into the third connecting loop 70 and the fourth connecting loop 72. It should be noted that this discussion is equally applicable to the first rope 12 and the second rope 14. As indicated by the arrows in FIG. 12, the hunter 78 can relatively move the second slip knot 68 and the third rope 18 in either direction to adjust the sizes of the third connecting loop 70 and the fourth connecting loop 72. As shown in FIG. 13, for example, the third connecting loop 70 has been made much smaller than the fourth connecting loop 72, such that the tension on the first panel 92 is greater than that on the second panel 94. As shown in FIG. 14, the hunter 78 now has firm support at his lower back and relatively loose support below his buttocks. The hunter 78 can shift more of his weight into leaning against the first panel 92 while his buttocks and legs have more freedom of movement. Conversely, the hunter 78 could adjust in the other direction to make the third connecting loop 70 larger and the fourth connecting loop 72 smaller. The design of the harness rope assembly 10 therefore provides the hunter 78 with the ability to adjust the different tensions even while in the tree or other elevated position.

Figure 16:
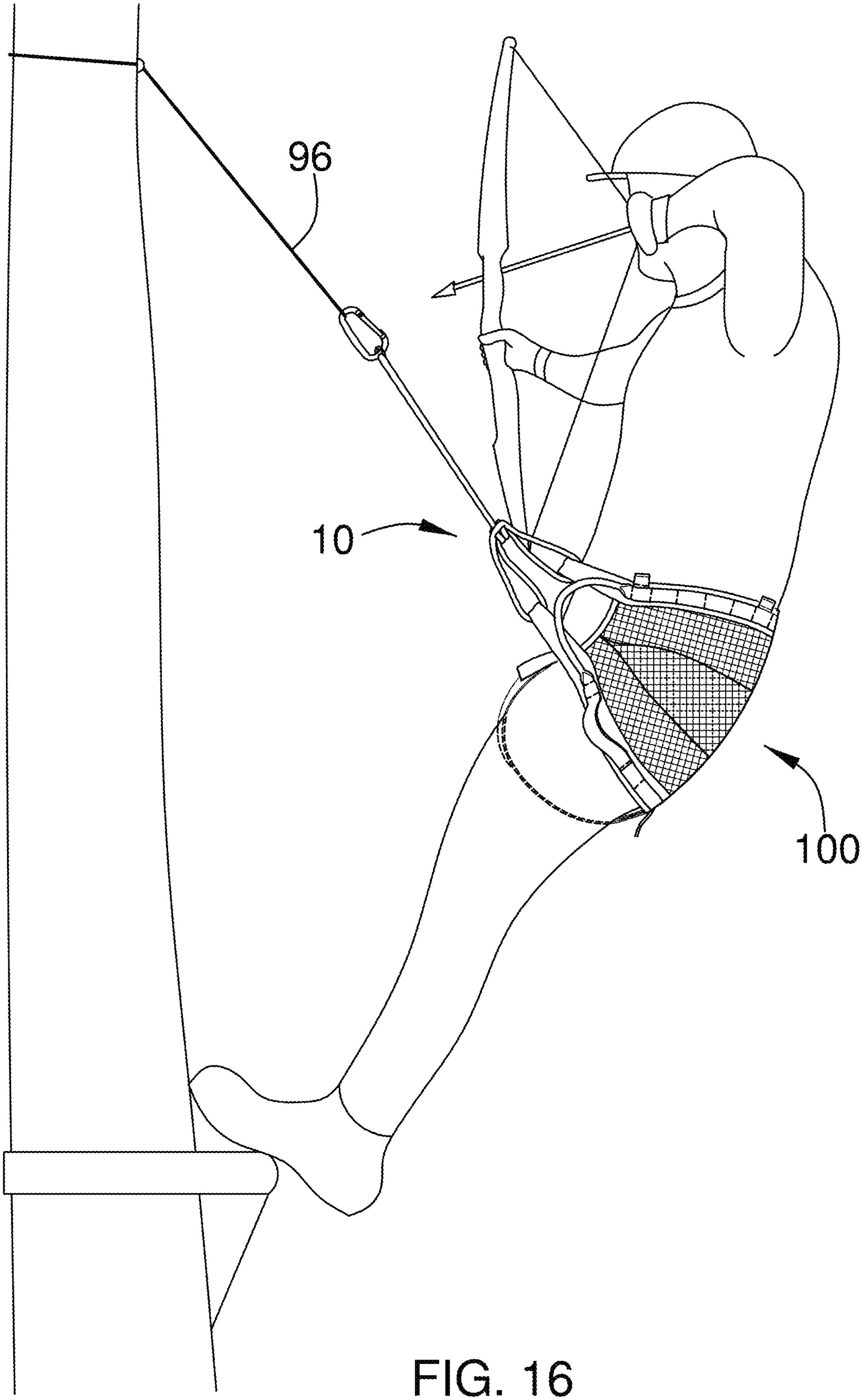
FIG. 16 is a side view of an embodiment of the disclosure in use with the one-panel hunting saddle harness assembly.

As mentioned above, FIGS. 15 and 16 show the one-panel saddle harness assembly 100. The one-panel saddle harness assembly 100 includes a panel 102 that is expandable and attached to and between a first strap 104 and a second strap 106. As shown in FIG. 16, each of the first pair of bridge loops 86 is attached to and projects, respectively, from a first end 108 of the first strap 104 and a second end 112 of the second strap 106. Each of the second pair of bridge loops 86 is attached to and projects, respectively, from a second end 110 of the first strap 104 and a second end 114 of the second strap 106. The same type of tension adjustment as discussed herein with respect to the two-panel saddle is applicable to the one-panel saddle 100 to adjust the tension at the first strap 104 and at the second strap 106.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A harness rope assembly comprising:

a first rope consisting of a loop;

a second rope including a closed loop, a first free tether, and a second free tether, each of said first free tether and said second free tether having a free end and an attached end, each of said attached ends being attached to each other and to said closed loop to form a central splice, each of said free ends being inserted through said loop of said first rope and into an interior of said second rope on either side of said central splice, each of said free ends being spliced to said closed loop to form a first closed attachment loop and a second closed attachment loop both interlocked with said loop of said first rope;

a bridge rope having a first end and a second end, said first end including an end loop; and a third rope including a closed circlet, a first free line, and a second free line, each of said first free line and said second free line having a loose end and a secured end, each of said secured ends being attached to each other and to said closed circlet to form a main splice, each of said loose ends being inserted through said end loop of said bridge rope and into an interior of said third rope on either side of said main splice, each of said loose ends being spliced to said closed circlet to form a first closed attachment circlet and a second closed attachment circlet both interlocked with said end loop of said bridge rope.

2. The harness rope assembly of claim 1, wherein:

said loop of said first rope is configured to be wrapped around said closed loop of said second rope to form a first slip knot dividing said closed loop into a first connecting loop and a second connecting loop; and said end loop of said bridge rope is configured to be wrapped around said closed circlet of said third rope to form a second slip knot dividing said closed circlet into a third connecting loop and a fourth connecting loop.

3. The harness rope assembly of claim 2, wherein:

said closed loop of said second rope is selectively slidable in said first slip knot to selectively adjust relative sizes of said first connecting loop and said second connecting loop; and said closed circlet of said third rope is selectively slidable in said second slip knot to selectively adjust relative sizes of said third connecting loop and said fourth connecting loop.

4. The harness rope assembly of claim 3, wherein:

each of said first connecting loop and said second connecting loop is configured to be coupled to a respective one of a first pair of bridge loops at a first end of a harness; and each of said third connecting loop and said fourth connecting loop is configured to be coupled to a respective one of a second pair of bridge loops at a second end of the harness.

5. The harness rope assembly of claim 3, wherein:

each of said first connecting loop and said second connecting loop is configured to be coupled to a respective one of a first pair of bridge loops at a first end of a one-panel saddle; and each of said third connecting loop and said fourth connecting loop is configured to be coupled to a respective one of a second pair of bridge loops at a second end of the one-panel saddle.

6. The harness rope assembly of claim 3, wherein:

each of said first connecting loop and said second connecting loop is configured to be coupled to a respective one of a first pair of bridge loops at a first end of a two-panel saddle assembly; and each of said third connecting loop and said fourth connecting loop is configured to be coupled to a respective one of a second pair of bridge loops at a second end of the two-panel saddle assembly.

7. The harness rope assembly of claim 3, wherein said first rope is positionable on said bridge rope between said first end and said second end of said bridge rope.

8. The harness rope assembly of claim 7, wherein said first rope is configured to be coupled to said bridge rope in the form of a friction hitch selectively positionable along said bridge rope between said first end and said second end of said bridge rope.

9. The harness rope assembly of claim 8, wherein said second end of said bridge rope includes a stop knot.

10. The harness rope assembly of claim 9, wherein:

each of said first connecting loop and said second connecting loop is configured to be coupled to a respective one of a first pair of bridge loops at a first end of a harness; and each of said third connecting loop and said fourth connecting loop is configured to be coupled to a respective one of a second pair of bridge loops at a second end of the harness.

11. The harness rope assembly of claim 9, wherein:

each of said first connecting loop and said second connecting loop is configured to be coupled to a respective one of a first pair of bridge loops at a first end of a one-panel saddle; and each of said third connecting loop and said fourth connecting loop is configured to be coupled to a respective one of a second pair of bridge loops at a second end of the one-panel saddle.

12. The harness rope assembly of claim 9, wherein:

each of said first connecting loop and said second connecting loop is configured to be coupled to a respective one of a first pair of bridge loops at a first end of a two-panel saddle assembly; and each of said third connecting loop and said fourth connecting loop is configured to be coupled to a respective one of a second pair of bridge loops at a second end of the two-panel saddle assembly.

13. The harness rope assembly of claim 1, wherein said first rope is positionable on said bridge rope between said first end and said second end of said bridge rope.

14. The harness rope assembly of claim 13, wherein said first rope is configured to be coupled to said bridge rope in the form of a friction hitch selectively positionable along said bridge rope between said first end and said second end of said bridge rope.

15. The harness rope assembly of claim 1, wherein said loop of said first rope is a continuous loop.

16. The harness rope assembly of claim 1, wherein said second end of said bridge rope includes a stop knot.

* * * * *